United States Patent [19]

Calullerovich

[11] 3,791,432

[45] Feb. 12, 1974

[54] WHEEL AND TIRE THEREFOR

[76] Inventor: Maximo Calullerovich, Ipiranga Ave. 81, Sao Paulo, Brazil

[22] Filed: June 8, 1972

[21] Appl. No.: 260,896

[30] Foreign Application Priority Data
June 14, 1971 Brazil .............................. 0363171

[52] U.S. Cl. ................................. 152/339, 152/331
[51] Int. Cl. ............................................. B60c 5/06
[58] Field of Search ............ 152/331, 339, 342, 329

[56] References Cited
UNITED STATES PATENTS

| | | | |
|---|---|---|---|
| 3,161,219 | 12/1964 | Danhi | 152/339 |
| 543,862 | 8/1895 | Gray | 152/339 |
| 2,990,869 | 7/1961 | Riley | 152/339 |
| 2,641,295 | 6/1953 | Des Rosiers | 152/339 |
| 3,059,957 | 10/1962 | Rasmussen | 152/339 |

*Primary Examiner*—Gerald M. Forlenza
*Assistant Examiner*—Robert Saifer
*Attorney, Agent, or Firm*—Steinberg & Blake

[57] ABSTRACT

A wheel having an inflatable tire and designed to be used on automobiles, airplanes, trucks, and the like. The tire has an outer wall provided with an outer tread surface and surrounding a predetermined axis, this outer wall having a pair of opposed side edge regions from which a pair of side walls extend integrally from the outer wall inwardly toward the axis and terminate in inner peripheral edges which surround the axis. An intermediate wall is integral with the outer wall and is situated between and spaced from the side walls, also extending inwardly toward the axis so as to define with the outer walls a pair of air chambers which are separated from each other by the intermediate wall. The wheel includes a suitable mounting structure on which the tire is mounted in such a way that fluid-tight seals are provided at the inner peripheral edges of the side and intermediate walls. In this way if the tire should become punctured or lose air pressure for any reason at one of its chambers it will still be capable of providing fully operative service as a result of the air pressure in the other of its chambers.

5 Claims, 4 Drawing Figures

3,791,432

WHEEL AND TIRE THEREFOR

BACKGROUND OF THE INVENTION

The present invention relates to wheels.

In particular, the present invention relates to wheels for surface vechicles of all types such as automobiles, trucks, and the like, as well as wheels for airplanes to support the latter while they taxi on the ground.

The present invention relates especially to wheels which have inflatable tires containing air under pressure for supporting a vehicle during travelling thereof.

As is well known, inflatable tires, while widely used, suffer from the drawback of unexpectedly losing pressure resulting in blowouts, flat tires, and the like. Often, due to unexpected puncturing of a tire, catastrophpic accidents occur, even when a vehicle is driven by a highly capable operator. All that is required for such an occurrence is a simple nail, a small piece of glass, or even a sharp stone, the tire being ruptured by such elements in a completely unexpected manner, thus creating the above dangerous conditions.

While many attempts have been made over the years to solve this problem, up to the present time there is no completely satisfactory solution.

SUMMARY OF THE INVENTION

It is accordingly a primary object of the present invention to provide a wheel, and a tire to be used therewith, which will avoid the above drawhacks.

In particular, it is an object of the invention to provide a wheel and an inflatable tire therefor which have a construction which will greatly reduce the possibility of dangerous conditions arising from loss of pressure in the tire.

In particular, it is an object of the invention to provide a wheel and inflatable tire therefor which will enable a vehicle to continue to travel even if the tire should encounter conditions which would create in a conventional tire a blowout or a flat tire.

The objects of the present invention also include the provision of a rim to be used with an inflatable tire of the invention and having a construction which also contributes to the safety which is achieved with the invention.

It is furthermore an object of the present invention to provide a wheel and tire therefor which are relatively inexpensive while still achieving the above objects.

Moreover, it is an object of the present invention to provide a wheel and tire therefor which can be used without difficulty on conventional vehicles and which will have an appearance and an operation, during normal use of the tire, which is not substantially different from the appearance and operation of conventional wheels and tires.

According to the invention the inflatable tire has an outer wall extending around a predetermined axis and having an outer tread surface as well as a pair of opposed side edge regions. A pair of side walls are integral with the outer wall of the tire, extending inwardly from the side edge regions thereof and respectively terminating in inner peripheral edges which surround the above axis. According to the invention the tire includes an intermediate wall which is integral with the outer wall and which also extends inwardly therefrom toward the above axis, terminating also in an inner peripheral edge surrounding this axis. The intermediate wall is situated between and spaced from the side walls to define with the latter a pair of air chambers which are separated from each other by the intermediate wall. A mounting means is provided for mounting the tire, this mounting means being surrounded by the tire and having a pair of outer sealing means and an intermediate sealing means. The pair of outer sealing means fluid-tightly engage the inner peripheral edges of the side walls while the intermediate sealing means fluid-tightly engages the inner peripheral edge of the intermediate wall, so that with this mounting means a pair of air chambers are provided which are separated from each other by the intermediate wall. If it should happen that the tire encounters a nail, a piece of glass, sharp stone, or the like, which would result either in a blowout or flat tire, the resulting loss of pressure will take place at only one of the air chambers, so that the wheel, and the inflatable tire thereof, will continue to give fully operative service at the remaining air chamber which maintains its pressure.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
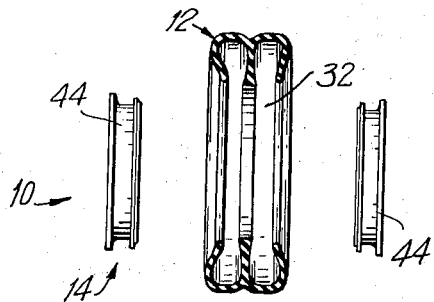
FIG. 1 is an exploded, partly sectional elevation of a wheel of the invention.
Figure 2:
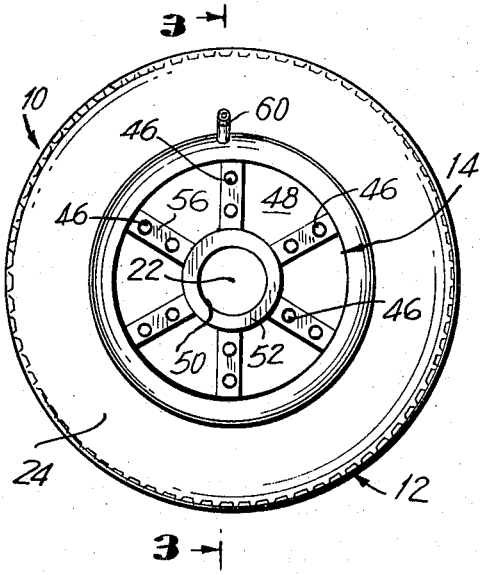
FIG. 2 is a side elevation of the wheel of the invention.

The wheel 10 of the present invention is shown in an exploded view in FIG. 1 and in its assembled condition in FIG. 2. The wheel 10 includes an inflatable tire 12 and a mounting means 14 on which the tire is mounted.

Figure 4:
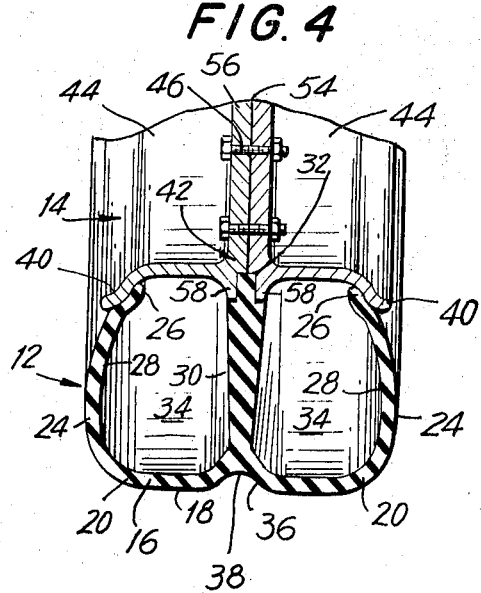
FIG. 4 is a fragmentary sectional illustration, on an enlarged scale as compared to FIG. 3, of that part of the structure which is illustrated at the lower end of FIG. 3.

The inflatable tire 12 is made of any material commonly used for inflatable tires such as natural or synthetic rubber or the like. The inflatable tire 12 includes an outer wall 16 having an outer tread surface 18 which will engage the ground on which a vehicle travels. This outer wall 16 has a pair of opposed side edge regions 20 where the outer wall 16, which surrounds a predetermined central axis 22, is integrally connected with a pair of side walls 24 which extend inwardly from the outer wall 16 toward the central axis 22. These side walls 24 respectively terminate in inner peripheral edges 26 which surround the central axis 22. These details of the tire are most clearly apparent from FIG. 4. The side walls 24 bulge outwardly and have inner concave surfaces 28. The side walls 24 are identical and form mirror images of each other. As is well known the side walls 24 are somewhat thicker at their inner peripheral edges 26 than at the remainder of the side walls.

According to the invention the tire 12 includes an intermediate wall 30 which is integral with the outer wall 16 and also extends inwardly therefrom toward the central axis 22. This intermediate wall 30 is made of the same material as remainder of the tire 12 and is formed integrally with the remainder of the tire simultaneously with the manufacture of the entire tire in a suitable mold. The intermediate wall 30 which thus extends integrally from the outer wall 16 inwardly toward the axis 22, has at its inner peripheral edge 32, which surrounds the axis 22, a thickness which is greater than the thickness of the wall 30 at the region of the outer wall 16. As is apparent particularly from FIG. 4, the thickness of the wall 30 gradually tapers from the inner peripheral edge 32 outwardly toward the outer wall 16. Moreover it will be noted that the inner peripheral edge 32 is located closer to the axis 22 than the inner peripheral edges 26, so that the diameter of the edge 32 is smaller than the diameter of the edges 26. In the illustrated example the intermediate wall 30 is situated midway between the walls 24 so as to define therewith a pair of equal annular air chambers 34.

According to a further feature of the invention the outer wall 16 is formed with an outer peripheral groove 36 of V-shaped cross section. The wall 30 is located in a plane which is normal to the axis 22, and the groove 36 has a crest 38 which is located in this latter plane.

The mounting means 14 for mounting the tire 12 of the wheel 10 includes a pair of outer sealing means 40 which engage the inner peripheral edges 26 of the side walls 24 so as to form fluid-tight connections therewith in a well known manner, thus sealing the chambers 34 at the edges 26. This mounting means 14 has an intermediate sealing means 42 engaging the inner peripheral edge 32 of the intermediate wall 30 for providing a fluid-tight engagement therewith. In this way the intermediate wall 30 together with the sealing means 42 will maintain the chambers 34 separated from each other.

Figure 3:
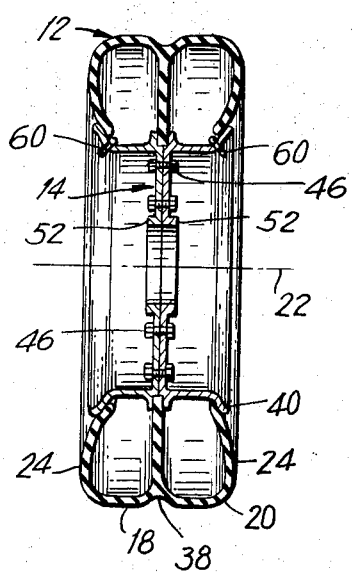
FIG. 3 is a sectional elevation of the wheel of FIG. 2 taken along line 3—3 of FIG. 2 in the direction of the arrows.

The mounting means 14 is made up of a split rim having a pair of rim units 44 which are shown separately in FIG. 1. A connecting means 46 forms part of the mounting means 14 for connecting the rim units 44 to each other. The rim units 44 respectively include inner flat annular walls 48 which surround the central opening 50 (FIG. 2) for receiving the axle. At their inner peripheries the walls 48 may be provided with outwardly directed flanges 52, as shown in FIG. 3. These walls 48 meet at an interface 54 which is in the plane in which the intermediate tire wall 30 is located. The connecting means 46 takes the form of suitable bolts and nuts which pass through aligned openings formed in the walls 48, and at these openings the walls 48 may each be provided with radially extending reinforcing ribs 56 (FIG. 2) which are somewhat thicker than the remainder of the walls 48. A pair of the bolt-and-nut assemblies which form the connecting means 46 are located at each of the ribs 56, as shown in FIG. 2.

The intermediate sealing means 42 of the mounting means 14 is formed by a pair of flanges 58 which are integral with the rim units 44 and which define between themselves a groove which receives the peripheral edge 32 of the intermediate wall 30. The thicker peripheral edge 32 of the wall 30 has a thickness which, before the edge 32 is received in the groove betwen the flanges 58, is greater than the width of this groove, so that the inner peripheral edge 32 is compressed between the flanges 58 to achieve the fluid-tight connection with the wall 30 at the sealing means 42.

The pair of rim units 44 are respectively provided with suitable conventional fittings 60 shown in FIGS. 2 and 3 for introducing air separately into the chambers 34, these conventional fittings 60 having known non-return valves which maintain the air under pressure within the chambers 34.

In order to assemble the tire 12 with the mounting means 14, the units 44 of the latter are separated from each other and the edges 26 of the wall 24 are placed inside of and in engagement with the pair of sealing means 40. The inner peripheral edge 32 of the wall 30 is placed between the flanges 58 while the connecting means 46 are tightened to form the assembly shown in FIGS. 2–4. Then air under pressure is introduced through the fittings 60.

During operation the pair of air chambers 34 are maintained separate from each other but the tire 12 functions in the manner of a conventional tire. The outer groove 36 at the tread surface of the wall 16 contributes toward an unusually good traction.

If it should happen that one or the other of the chambers 34 loses pressure for any reason, the other chamber 34 will maintain its pressure and the wheel will continue to gove good safe service. At this time, which is to say when one of the air chambers 34 loses its pressure, the other air chamber will give an exceedingly good support, and one of the factors which contributes to this efficient operation under these conditions is the groove 36 which in effect forms for the remaining chamber which remains under pressure a peripheral edge similar to one of the edge regions 20, thus achieving a highly effective performance of the one remaining air chamber. At the same time, if one of the chambers 34 should lose air pressure, the appearance of the tire will change so that when the operator stops and gets out of the vehicle he will simply by glancing at the tire immediately perceive that one of the chambers is without pressure. The operator can then proceed to a suitable service station or the like in order to repair the tire so as to continue thereafter the operation thereof with both of the chambers 34 under pressure.

Thus, with the structure of the invention the vehicle may appear to have a pair of tires on each wheel but actually has only a single tire whose interior space is divided into a pair of separate air chambers by the intermediate wall 30. With the structure of the invention it is not possible for the entire tire to go flat since if a puncturing element should strike a central region of the tire nothing will happen whereas if it strikes a lateral region of the tire only one of the chambers will be effected. Under these conditions the vehicle can be braked in a normal manner, and there is no danger of the operator losing control of the steering of the vehicle.

What is claimed is:

1. A wheel comprising an inflatable tire having an outer wall surrounding a predetermined axis and having an outer thread surface and a pair of opposed side edge regions, a pair of opposed side walls integral with said outer wall and extending from said side edge regions thereof inwardly toward said axis, said side walls respectively terminating in inner peripheral edges surrounding said axis, and an intermediate wall integral with said outer wall and situated midway between and spaced from said side walls in a plane normal to said axis, said intermediate wall also extending inwardly from said outer wall toward said axis and terminating in an inner peripheral edge surrounding said axis, said intermediate wall having a greater thickness at the region of its inner peripheral edge than at the region of said outer wall and said thickness of said intermediate wall gradually tapering from said inner peripheral edge toward said outer wall, and mounting means for mounting said tire, said mounting means being surrounded by and engaging said tire and said mounting means including a pair of opposed side sealing means and an intermediate sealing means located between said pair of opposed side sealing means, said pair of opposed side sealing means of said mounting means engaging said inner peripheral edges of said side walls for forming fluid-tight connections therewith and said intermediate sealing means of said mounting means engaging said inner peripheral edge of said intermediate wall for forming a fluid-tight connection therewith, whereby said mounting means and said tire form together a pair of air chambers separated by said intermediate wall, said intermediate sealing means of said mounting means defining an annular groove of rectangular cross section in which said intermediate wall is compressed at said inner peripheral edge thereof and at the portion of said intermediate wall which adjoins said intermediate peripheral edge thereof and is situated in said groove.

2. The combination of claim 1 and wherein said mounting means is in the form of a split rim having a pair of rim units respectively provided with said side sealing means which engage said inner peripheral edges of said side walls, said mounting means including a connecting means for connecting said rim units together, and said rim units respectively having inner peripheral flanges which when said rim units are connected together by said connecting means define said annular groove receiving said inner peripheral edge of said intermediate wall.

3. The combination of claim 2 and wherein said rim units engage each other at an interface situated in a plane normal to said axis, said intermediate wall being located in said plane.

4. The combination of claim 3 and wherein said outer wall is formed with an exterior annular groove of substantially V-shaped cross section having a crest situated in said plane.

5. The combination of claim 1 and wherein said inner peripheral edge of said intermediate wall is located closer to said axis than said inner peripheral edges of said side walls.

* * * * *